US007305795B1

(12) United States Patent
Tooman

(10) Patent No.: US 7,305,795 B1
(45) Date of Patent: Dec. 11, 2007

(54) BARN WINDOW

(76) Inventor: Barbara A. Tooman, 2315 Hannemann Rd., Grafton, WI (US) 53024

( * ) Notice: Subject to any disclaimer, the term of this patent is extended or adjusted under 35 U.S.C. 154(b) by 677 days.

(21) Appl. No.: 10/691,819

(22) Filed: Oct. 23, 2003

(51) Int. Cl.
*E05D 15/22* (2006.01)
(52) U.S. Cl. .............................. 49/164; 49/149; 49/152; 49/153; 49/163; 49/187; 49/246; 49/250; 49/252
(58) Field of Classification Search .................. 49/149, 49/152, 153, 161, 162, 163, 164, 165, 187, 49/246, 247, 250, 252
See application file for complete search history.

(56) References Cited

U.S. PATENT DOCUMENTS

| 654,129 | A | * | 7/1900 | Brown ......................... 49/164 |
| 2,739,355 | A | * | 3/1956 | Poggi .......................... 49/164 |
| 3,154,822 | A | * | 11/1964 | Smith .......................... 49/246 |
| 3,667,162 | A | | 6/1972 | Lalague |
| 3,911,621 | A | | 10/1975 | McHeffey |
| 4,059,924 | A | | 11/1977 | Bierlich |
| 4,339,892 | A | | 7/1982 | Ulbricht et al. |
| 4,679,352 | A | * | 7/1987 | Bates .......................... 49/192 |
| 5,398,446 | A | * | 3/1995 | Kunert ........................ 49/169 |
| 5,881,498 | A | | 3/1999 | Goggin et al. |
| 6,421,960 | B1 | | 7/2002 | Manzella |

* cited by examiner

*Primary Examiner*—Jerry Redman

(57) ABSTRACT

A window for use in buildings for housing animals, such as barns, that is openable in two generally perpendicular directions, is provided. The window includes an outer frame secured within an opening in the structure, a middle frame that is pivotally secured to the outer frame, and an inner frame pivotally secured to the middle frame. A first pivoting mechanism includes a pair of hinges that enable one of the frames to be pivoted with respect to the outer frame along a generally vertical axis, and the second pivoting mechanism enables the other frame to be pivoted with respect to the outer frame along a generally horizontal axis. The second mechanism pivots and slides one of the frames in order to open the window for ventilation purposes while enabling the remaining frame to remain closed, thereby preventing the entering or exiting of large objects through the window, such as an animal's head.

19 Claims, 5 Drawing Sheets

BARN WINDOW

FIELD OF THE INVENTION

The present invention relates to windows in general, and more specifically to windows for use in conjunction with buildings or other structures used for housing animals.

BACKGROUND OF THE INVENTION

In barns and other structures utilized to house animals of various types, windows are necessary in order allow ventilation of the structure, and in specific situations to enable the animal to access the exterior of the structure. With specific regard to larger animals, such as horses, these windows can provide the horse with the ability to extend its head out of the window.

For animals who spend any time in a barn, light and proper ventilation are important factors in keeping those animals healthy. Most animals do best when living as close as possible to their natural outside habitat, as they are not used to being confined. For their mental well-being, the ability to see what is going on outside is important.

It is not always practical to keep animals outside, especially in northern climates. In the case of horses, expensive show or race horses must spend quite a lot of time in their stalls. In a situation where each horse is housed in an individual stall within the barn, good ventilation and light becomes paramount.

Many modern barns use plastic light panels which run the length of the barn wall just under the roofline. To augment this, skylights are placed in the roof over the center aisle to provide more daylight. Ventilation is provided by using ceiling fans and opening the end doors of the barn. The horse never sees the real world until he is led outside.

Other barns have individual windows for each stall which can be opened by various methods, either sliding one panel behind another or pushing out or pulling in. Often, the windows are left shut because they are painted shut, or because the windows have grills or mesh in front of them which necessitates the windows being opened from the outside.

Southern horse barns are often designed as a long shed with an outside covered aisle. Each stall opens onto the aisle by means of a dutch door—a door split side to side. By opening the top half, the horse has plenty of light and air. But in bad weather and at night, the top half is closed—the horse has no window and little ventilation.

Except for the situation when a horse is recovering from surgery and requires quiet and darkness, it is part of the therapy for recovery that a horse who is confined to his stall has adequate light and ventilation. He will recover sooner if he can see what is going on outside his stall.

In northern barns, extreme weather is an important consideration in designing openable windows. Ideally, the window should protect the horse from snow, rain and wind even when opened. Barn windows which slide open or open to the inside cannot protect the horse from the elements and still provide ventilation.

No matter what form the individual stall window takes, in too many barns the window design is an afterthought during the design process. Windows become an expensive detail and are often reduced to the least costly size without much thought to the horse's well-being.

However, with the majority of windows used in permanent structures housing animals for this purpose, the windows are openable in only a single direction, i.e., about a generally vertical axis, such that when the window is open, any precipitation, dust or other debris, can be carried by the wind into the structure housing the animal through the open window. Further, when these windows are closed, while precipitation and debris are prevented from entering the structure, ventilation is significantly reduced as the window prevents any movement of air between the interior and exterior of the structure.

Other prior art windows have been developed that include mechanisms which allow the window to move along separate axes, such as a horizontal axis and a vertical axis to enable the window to provide ventilation even in inclement weather conditions. Examples of these types of windows are shown in Lalagüe U.S. Pat. No. 3,667,162 and McHeffey U.S. Pat. No. 3,911,621, which are herein incorporated by reference. However, with these types of windows, the pivoting mechanisms necessary to move the window in the various directions involve many interlocking and moving parts, making the mechanism expensive and difficult to service.

Therefore, it is desirable to develop a window for an animal-housing structure that provides the ability to prevent precipitation and other debris from entering the structure while simultaneously enabling sufficient ventilation of the interior of the structure. To do so, the window should be independently movable in generally perpendicular directions using separate pivoting mechanisms that are of simple and inexpensive construction. The window constructed to achieve these goals should also be easy to operate and maintain.

SUMMARY OF THE INVENTION

According to a primary aspect of the present invention, a barn window is provided in which the window includes an outer frame secured to the barn or animal housing structure, a middle frame movably secured to the outer frame, and an inner frame movably secured to the middle frame. The inner frame and middle frame are movably secured to the middle frame and outer frame, respectively, utilizing a pair of simple hinge mechanisms which enable the inner frame and middle frame to be pivoted with respect to the outer frame and one another in directions that are generally perpendicular to one another.

More specifically, one of the hinge mechanisms is formed of a pair of simple hinges which enable one frame part to pivot along a generally vertical axis with respect to the outer frame of the window. The second mechanism includes a guide member secured to one movable frame part and defining a channel therein. A brace is pivotally connected at each end between the guide member and the other movable frame part, and a slide member is pivotally connected to the other frame part and is slidably positioned within the channel defined by the guide member. Thus, when the other frame part is moved with respect to the one frame part using the second mechanism, the brace and other frame part pivot with respect to the one frame part and guide member, as the slide member moves along the channel defined by the guide member. The movement of the other frame part is along a generally horizontal axis that is approximately perpendicular to the vertical axis along which the one frame part can be moved with respect to the outer frame. Thus, the window can be operated in a manner which prevent precipitation from directly entering the window when the other frame part is opened with respect to the one frame part and outer frames, while simultaneously enabling air to circulate through the one frame part and outer frame into the interior of the barn or housing.

According to a secondary aspect of the present invention, the inner frame is formed with a safety glass pane to provide a barrier for precipitation and other debris from passing through the window, while the outer frame includes a number of bars designed to allow air to pass through the window but to prevent an animal located within the barn including the window from extending its head through the window. The bars are affixed to the inner frame instead of the fixed frame on the inside of stall for ease of operating both the window and the door.

According to still another aspect of the present invention, the window is designed to have a simple construction that is easy to utilize and can be incorporated into existing window structures on barns and other animal-enclosing structures.

Numerous additional advantages, features and objects of the present invention will be made apparent from the following detailed description taken together with the drawing figures.

BRIEF DESCRIPTION OF THE DRAWINGS

The drawings illustrate the best mode currently contemplated of practicing the present invention.

In the drawings.

DETAILED DESCRIPTION OF THE INVENTION

Figure 1:
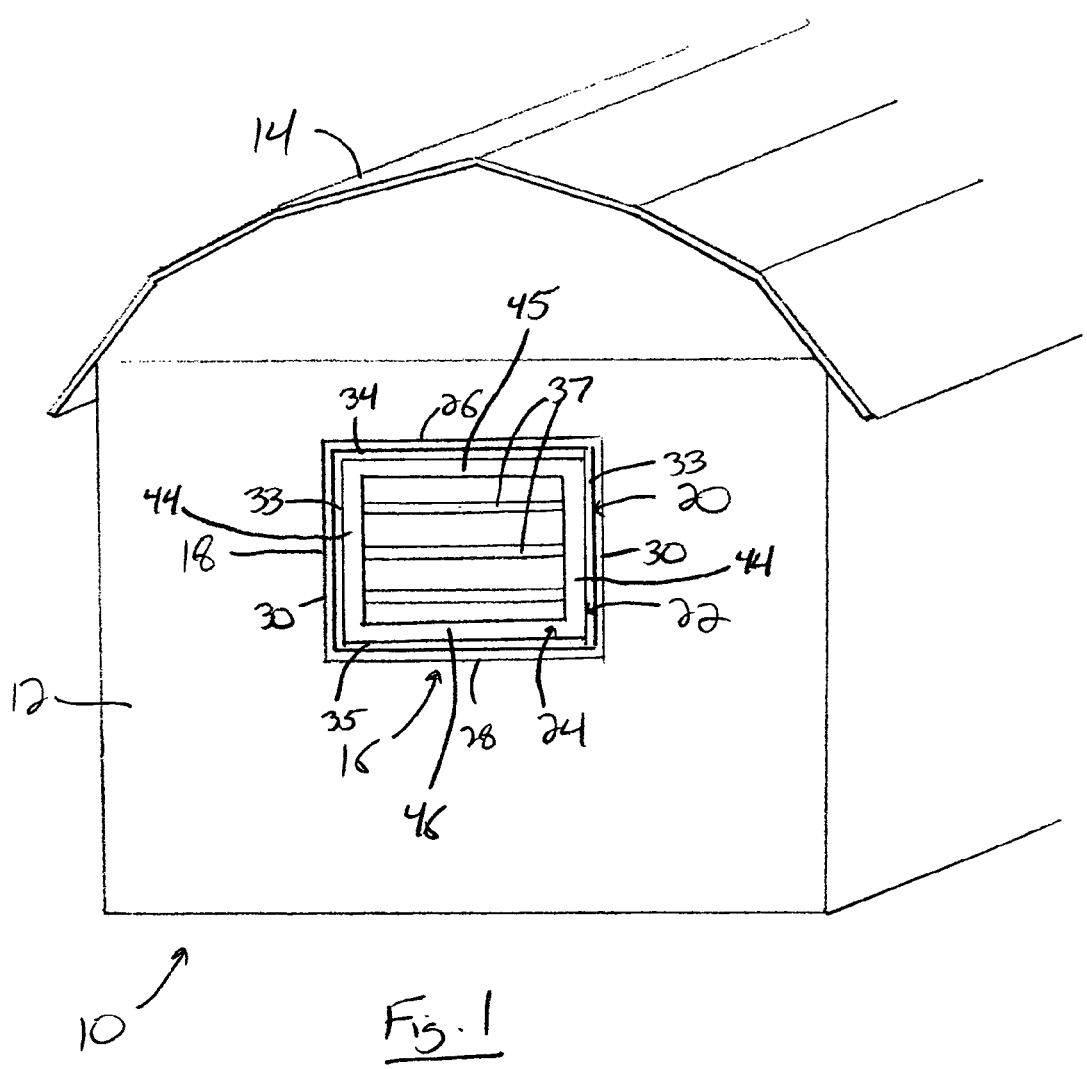
FIG. 1 is a partially broken away, isometric view of a barn including the window constructed according to the present invention.

With regard to the drawing figures in which like reference numerals designate like parts throughout the disclosure, an animal-housing structure, such as a barn, is disclosed generally at 10 in FIG. 1. The barn includes an outer wall 12 and a roof 14 and can be divided into a number of separate enclosures, such as paddocks (not shown) located within the interior of the barn 10 that are adapted to receive and retain one or more animals therein. In the outer wall 12, and adjacent each of the interior spaces, the barn 10 includes a window 16 that allows access from the exterior of the barn 10 into the interior spaces. The window 16 is positioned within an opening 18 in the outer wall 12 and includes an outer frame 20, a middle frame 22 positioned within the outer frame 20, and an inner frame 24 positioned within the middle frame 22 opposite the outer frame 20. Each of the outer frame 20, middle frame 22 and inner frame 24 can be formed of any suitable material utilized for a building construction, such as a metal, for example, aluminum, or a plastic or other rigid material, such as a wood. Further, depending upon the shape of the particular opening 18 in the barn 10, the shape of the outer frame 20, middle frame 22 and inner frame 24 can be configured as necessary to conform to the opening 18.

Figure 2:
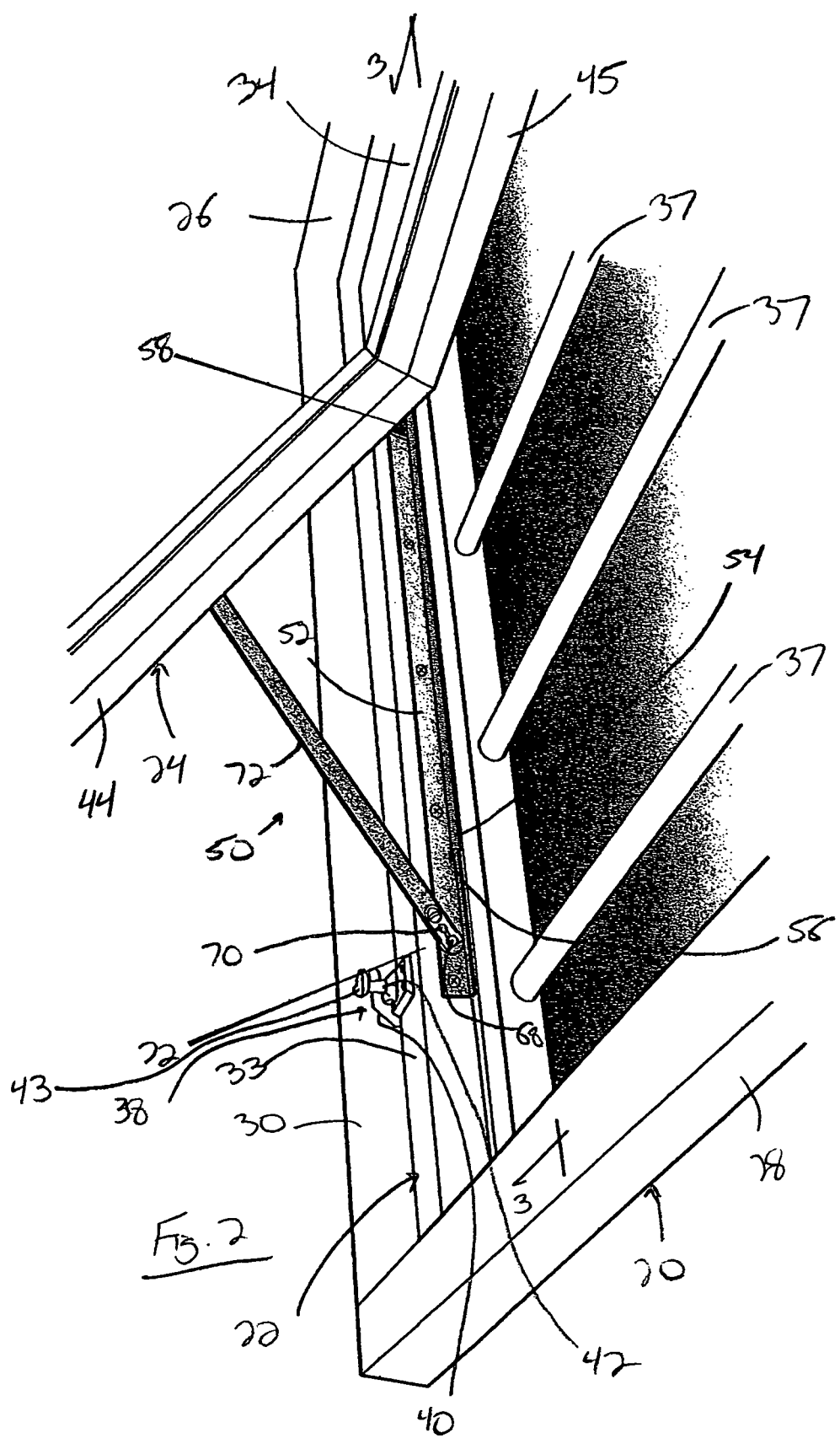
FIG. 2 is a partially broken away isometric view of the inner frame of the window of FIG. 1 in an open position.

In a particularly preferred embodiment best shown in FIGS. 1 and 2, the outer frame 20 is formed to have a generally rectangular shape including an upper member 26 and lower member 28 that are positioned opposite one another within the opening 18 and are joined by a pair of side members 30 in order to retain the window 16 within the opening 18 in any conventional manner. Each of the upper member 26, lower member 28 and side members 30 are secured to the opening 18 and to one another using any appropriate means, such as by utilizing a suitable adhesive or suitable mechanical fasteners, such as nails or screws. Further, the outer frame 20 has an overall width greater than the width of the middle frame 22 and inner frame 24 such that the outer frame 20 provides an enclosure for each of the middle frame 22 and inner frame 24 when in the closed position. Because of this, the outer frame 20 can include other features, such as a number of bars 37 extending between the opposed side members 30 and spaced inwardly from the middle frame 22 and inner frame 24. The bars 37 are formed of a rigid material, such as a metal, and prevent large objects from being able to be passed through the interior of the window 16. In a preferred embodiment, the bars 37 are releasably secured to the outer frame 20 such that the bars 37 can be removed to enable an animal (not shown) to extend its head through the window 16.

Looking now at FIGS. 1-5, the middle frame 22 is formed to have a shape complimentary to the interior of the outer frame 20 with a pair of opposed sides 33 adjacent the wide members 30, and a top 34 and bottom 35 joining opposite ends of the sides 33. The sides 33 of the middle frame 22 are generally rectangular in shape, but each includes an annular shoulder 36 located adjacent one end of each side 34 and opposite the outer frame 20. The shoulders 36 are used to properly align the middle frame 22 and inner frame 24 in the closed position in a manner to be described. The top 34 and bottom 35 also preferably have a shoulder 36 formed thereon for reasons to be described.

The middle frame 22 is secured to the outer frame 20 by a pair of hinges 32 secured between one side member 30 of the outer frame 20 and the adjacent side 33 of the middle frame 22. The hinges 32, which are preferably simple piano hinges, enable the middle frame 22 to pivot along a generally vertically axis defined by the hinges 32 to enable the middle frame 22 to be moved outwardly from the outer frame 20 and the barn 10. When the middle frame 22 is pivoted about the hinges 32, the window 16 is opened in a conventional manner which can expose the interior of the window 16 to enable the head of an animal (not shown) to be extended through the window 16.

The middle frame 22 can be maintained in the closed position through the use of a locking mechanism 38 best shown in FIG. 2. The locking mechanism 38 includes a catch 40 disposed on a side member 30 of the outer frame 20, and a latch member 42 disposed on the adjacent side 34 of the middle frame 22. When the middle frame 22 is in the closed position, the latch member 42 can be moved or rotated utilizing a handle 43 operably connected thereto in order to engage the latch 42 with the catch 40 and lock the middle frame 22 with respect to the outer frame 20 in a manner which is known. The latch member 42 can then be disengaged from the catch 40, allowing the middle frame 22 to move freely with respect to the outer frame 20. Further, while the locking mechanism 38 is preferably formed utilizing the catch 40 and latch member 42, other suitable mechanisms are capable of being utilized in order to releasably secure the middle frame 22 to the outer frame 20.

Looking again at FIGS. 1-5, disposed within the middle frame 22 is the inner frame 24 which is shaped similarly to and positioned concentrically with respect to the middle frame 22 and outer frame 20. The inner frame 24 has a pair of opposed ends 44 joined by a top end 45 and a bottom end 46. Each end 44 includes an inner shoulder 47 and an outer shoulder 48 located on opposite sides of each end 44. The outer shoulder 48 is formed to engage the shoulder 36 on the adjacent side 33 of the middle frame 22 when the inner frame 24 is closed with respect to the middle frame 22. The engagement of the respective shoulders 36 and 48 provides a stop for the movement of the inner frame 24 with respect to the middle frame 22 and operates to prevent any moisture or debris from passing between the inner frame 24 and middle frame 22. This function can also be enhanced by providing a sealing strip or member (not shown) on one of the shoulders 36 or 48 that is compressed to form a watertight seal when the inner frame 24 is positioned against the middle frame 22.

Between the inner shoulders 47, the inner frame 24 includes a glass pane 49 secured to and within the inner frame 24 in any suitable manner, such as by an adhesive 100. The adhesive 100 forms a watertight seal between the pane 49 and the inner frame 24 such that the inner frame 24 prevents any precipitation or other materials from passing through the window 16 from or into the interior of the barn 10. The shoulders 47 and 48 are also preferably located on the top end 45 and bottom end 46 to engage the middle frame 22 and pane 49 in the member described previously.

Figure 3:
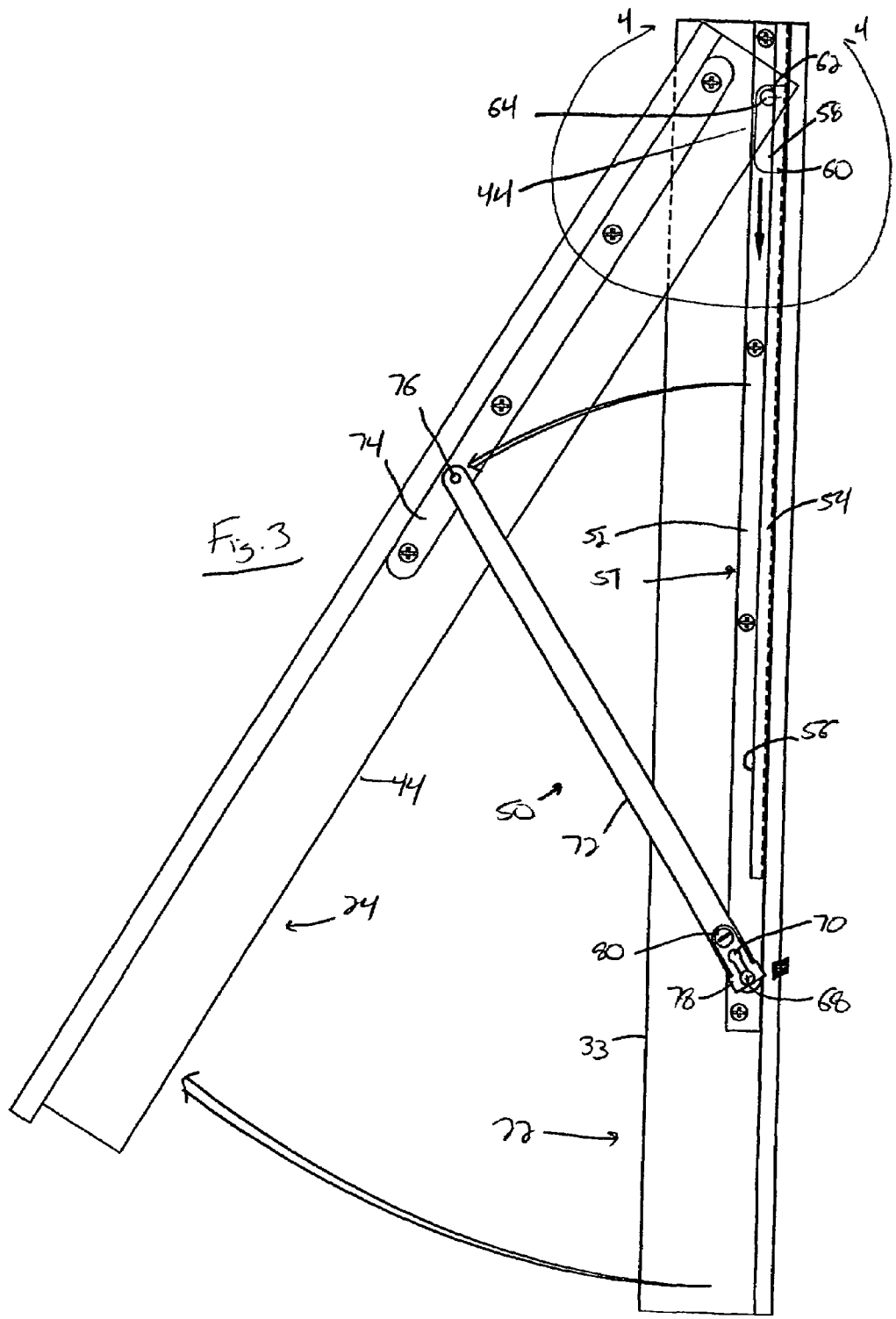
FIG. 3 is a cross-sectional view along line 3-3 of FIG. 2.
Figure 4:
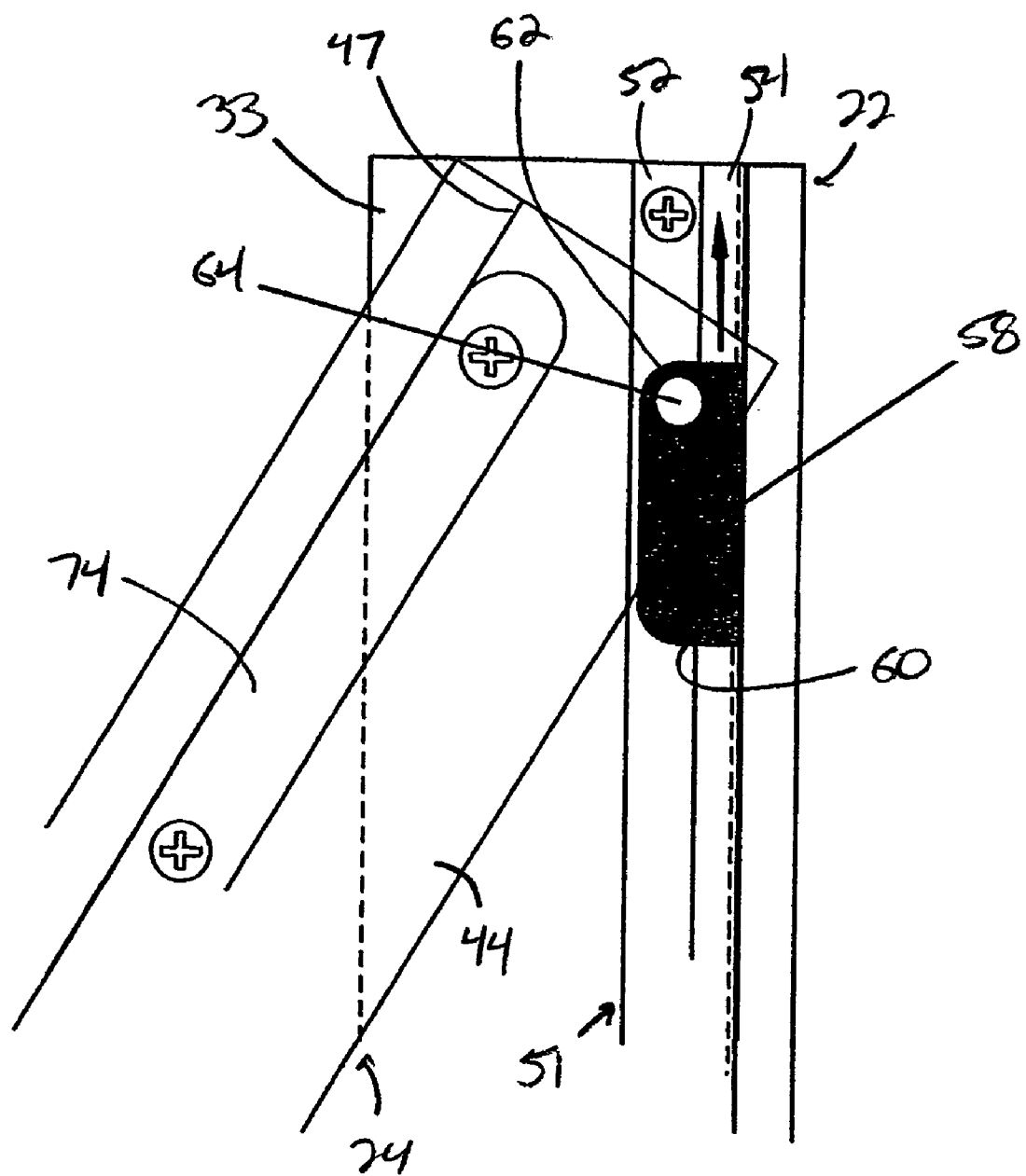
FIG. 4 is a circular cross-sectional view along line 4-4 of FIG. 3.
Figure 5:
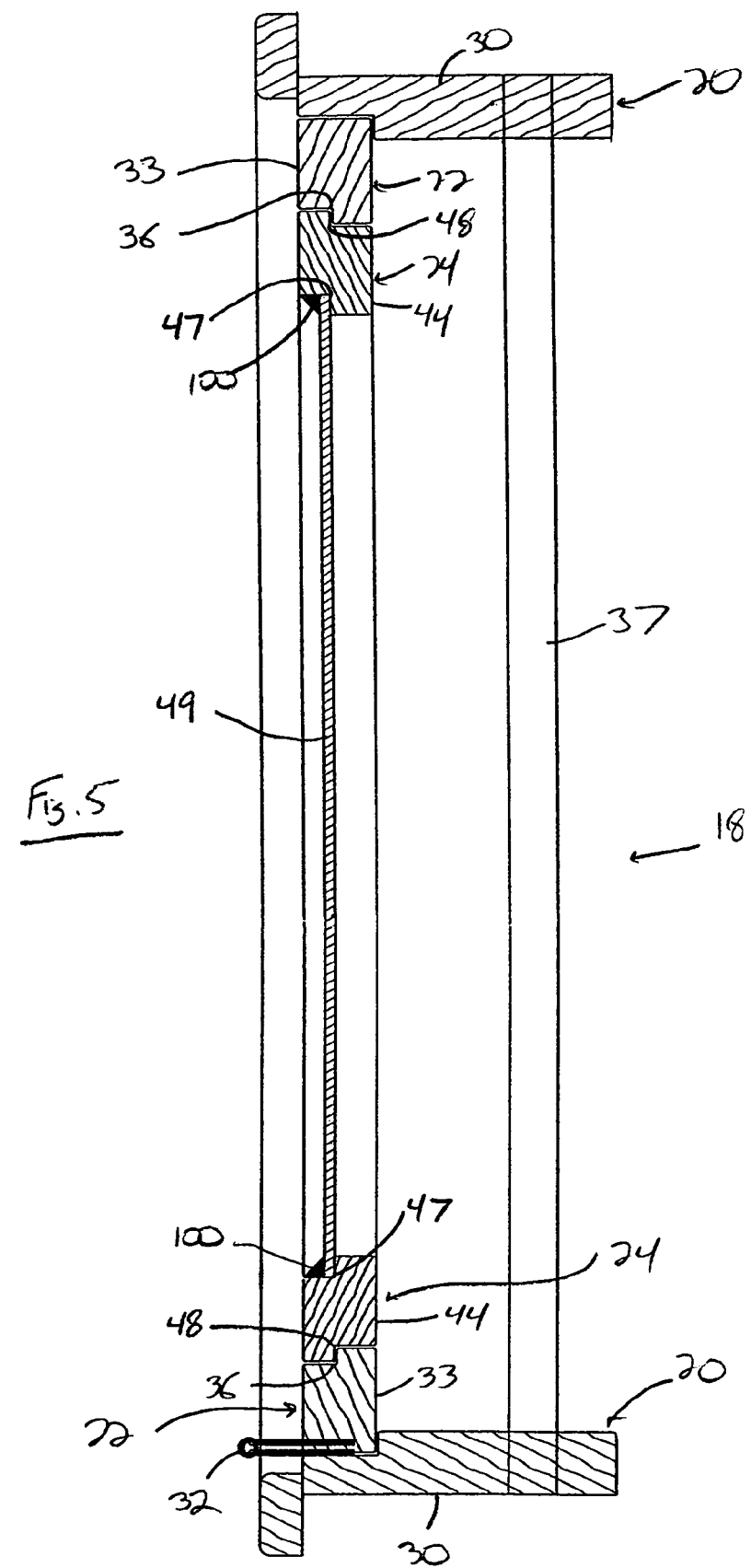
FIG. 5 is a partially broken away isometric view of the middle frame of the window of FIG. 1 in an open position.

Referring now to FIGS. 2-4, the inner frame 24 is connected to the middle frame 22 by a second hinge mechanism 50 that enables the inner frame 24 to pivot with respect to the middle frame 22 along a generally horizontal axis that is essentially perpendicular to the vertical axis about which the middle frame 22 pivots with respect to the outer frame 20. The second mechanism 50 includes a pair of guide members 51 secured to each side 33 of the middle frame 22. Each guide member 51 is formed of a securing plate 52 fixedly attached to each side 33, such as by a suitable adhesive or mechanical fastener, including nails or screws, and a rail member 54 extending outwardly from the securing plate 52 and defining a channel 56 therebetween. The securing plate 52 and rail member 54 are preferably integrally formed with one another of a generally rigid material, such as a metal, but can be formed of other materials and as separate components as necessary.

The channel 56 receives a slide member 58 having a base 60 positioned within the channel 56 and slidable along the channel 56. The slide member 58 is formed of a low friction material, that preferably is a plastic, such as polyethylene. Opposite the base 60, the slide member 58 extends outwardly from the channel 56 and defines an opening 62 in which is held a pivot pin 64. The pivot pin 64 is received within a corresponding bore (not shown) disposed in the side 44 of the inner frame 24 such that the inner frame 24 can pivot with respect to the pin 64.

Looking specifically at FIG. 3, generally opposite the slide member 58, the securing plate 52 includes a pivot shaft 68 extending inwardly perpendicular to the guide member 50. The shaft 68 is engaged within a keyhole slot 70 formed in one end of a rigid, preferably metal brace 72 that extends between the pivot shaft 68 and the inner frame 24. The brace 72 is connected to the inner frame 24 opposite the slot 70 by an attachment plate 74 affixed to the end 44 of the inner frame 24 that includes a pivot pin 76 to which the brace 72 is rotatably secured. The plate 74 and pin 76 are preferably formed of a rigid material and integrally formed with one another, and are affixed to the side blank of the inner frame 24 by any suitable means, such as mechanical fasteners, including screws.

The slot 70 formed on the brace 72 is formed within a detachable portion 78 secured to the brace 72 by a fastener 80. Thus, when it is desired to detach the inner frame 24 from the second mechanism 50, such as for cleaning purposes, the fastener 80 can be removed from the detachable portion 78 and brace 72, allowing the pivot shaft 68 to be withdrawn from the keyhole slot 70, thereby disengaging the inner frame 24 from the second pivot mechanism 50.

In operation, the pivot shaft 68 is attached opposite the brace 72 to an operating mechanism (not shown) as is known in the art that can be utilized to rotate the pivot shaft 68 and brace 72 in order to move the inner frame 24 with respect to the middle frame 22. As the pivot shaft 68 and brace 72 are rotated, the brace 72 pushes the attachment plate 74 and inner frame 24 outwardly from the middle frame 22, consequently pivoting the inner frame 24 about the pivot pin 64 and simultaneously sliding the slide member 58 along the channel 56 towards the pivot shaft 68. When the pivot shaft 68 is rotated in the opposite direction to close the window 16, the slide member 58 moves away from the pivot shaft 68 along the channel 56, and the brace 72 becomes partially engaged within the channel 56 opposite the slide member 58 to provide a more secure, locked configuration for the window 16.

Alternatively, the operating mechanism can be omitted and the movement of the inner frame 24 with regard to the middle frame 22 can be controlled by biasing the second hinge mechanism 50. More specifically, a spring (not shown) having a desired bias or spring rate can be attached between the slide member 58 and the securing plate 52 near the top 34 of the middle frame 22. The spring is in a relaxed state when the inner frame 24 is closed, and is stretched when the slide member 58 is moved along the securing plate 52 due to the pivoting of the second hinge mechanism 50. The bias of the spring is sufficient to hold the inner frame 24 in the desired position without urging the inner frame 24 back to the closed position.

Various other features, objects and advantages of the present invention are considered to be within the scope of the following claims particularly pointing out and distinctly claiming the subject matter regarded as the invention.

I claim:

1. A barn window comprising:
   a) an outer frame having an upper end, a lower end and a pair of opposed sides extending between the upper end and the lower end;
   b) a middle frame positioned within the outer frame, the middle frame having an upward end, a downward end and a pair of supports extending between the upward end and the downward end;
   c) an inner frame positioned within the middle frame, the inner frame having a top end, a bottom end, and a pair of opposed edges extending between the top end and bottom end;
   d) a first pivoting mechanism secured between the middle frame and the outer frame, the first mechanism operable to pivot the middle frame and the inner frame with respect to the outer frame in a first direct direction; and
   e) a second pivoting mechanism secured between the inner frame and the middle frame, the second mechanism operable to pivot and slide the inner frame with respect to the middle frame in a second direction that is generally perpendicular to the first direction.

2. The window of claim 1 wherein the second pivoting mechanism comprises:
   a) a first guide member secured to the middle frame;

b) a first brace pivotally connected to one end of the first guide member and to the inner frame; and c) a first slide pivotally connected to the inner frame and slidably retained within the first guide member.

3. The window of claim 2 wherein the second pivoting mechanism further comprises:

a) a second guide member disposed on the middle frame opposite the first guide member;

b) a second brace pivotally connected to the second guide member and to the inner frame; and c) a second slide pivotally connected to the inner frame and slidably retained within the second guide member.

4. The window of claim 2 wherein the first guide member comprises:

a) a securing plate positioned against the middle frame; and b) a rail member extending outwardly from one side of the securing plate to define a channel between the securing plate and the rail member in which the first slide is received.

5. The window of claim 2 wherein the first guide member includes a pivot pin located adjacent one end of the first guide member that is releasably engageable with the first brace.

6. The window of claim 5 wherein the first brace is rotatable with respect to the first guide member.

7. The window of claim 6 wherein the first brace has a keyhole slot releasably engageable with the pivot pin.

8. The window of claim 7 wherein the pivot pin is rotatable with respect to the first guide member.

9. The window of claim 2 wherein the first slide includes a base portion retained in the first guide member and a holding portion extending outwardly from the base portion.

10. The window of claim 9 wherein the holding portion includes an opening that rotatably receives a pivot shaft extending between the holding portion and the inner frame.

11. A barn window comprising:

a) an outer frame adapted to be secured within a building opening;

b) a middle frame positioned within the outer frame;

c) an inner frame positioned within the middle frame;

d) a first pivoting mechanism secured between the outer frame and the middle frame, the first mechanism operable to pivot the middle frame in a first direction; and e) a second pivoting mechanism secured between the middle frame and the inner frame, the second mechanism operable to pivot and slide the inner frame in a second direction generally perpendicular to the first direction.

12. The window of claim 11 wherein the second mechanism comprises:

a) at least one guide member secured to the middle frame;

b) at least one brace pivotally attached to the at least one guide member and to the inner frame; and c) at least one slide pivotally connected to the inner frame at a location spaced from the at least one brace and slidably retained in the at least one guide member.

13. The window of claim 12 wherein the at least one brace is secured opposite the at least one guide member to at least one attachment plate positioned on the inner frame.

14. The window of claim 13 wherein the at least one brace includes a pivot pin rotatably engaged with the at least one brace.

15. The window of claim 12 wherein the at least one slide is retained within a channel defined by the at least one guide member.

16. The window of claim 15 wherein the at least one slide is formed of a low-friction material.

17. The window of claim 15 wherein the at least one brace is engaged within the channel of the at least one guide member when the inner frame is in a closed position with regard to the middle frame.

18. A window comprising:

a) an outer frame including a number of spaced bars adapted to be secured within an opening in a building;

b) a middle frame positioned within the outer frame and including a number of first annular shoulders;

c) an inner frame positioned within the middle frame and including a glass pane and a number of second annular shoulders engageable with the first shoulders;

d) a first pivoting mechanism secured between the outer frame and the middle frame, the first mechanism operable to pivot the middle frame in a first direction; and e) a second pivoting mechanism secured between the middle frame and the inner frame, the second mechanism operable to pivot and slide the inner frame a second direction generally perpendicular to the first direction.

19. The window of claim 18 further comprising at least one locking mechanism secured between one of the outer frame and the middle frame, or the middle frame and the inner frame.

* * * * *